UNITED STATES PATENT OFFICE.

MAX A. ROESSIG, OF OMAHA, NEBRASKA.

COMPOSITION FOR TREATING CANVAS AND OTHER FABRICS.

988,388.  Specification of Letters Patent.  Patented Apr. 4, 1911.

No Drawing.  Application filed October 20, 1910.  Serial No. 588,107.

*To all whom it may concern:*

Be it known that I, MAX A. ROESSIG, of the city of Omaha, county of Douglas, and State of Nebraska, have invented a new and useful Composition for Treating Convas and other Fabrics, which is described in the following specification.

My said composition is primarily designed to be applied to cotton fabrics for the double purpose of rendering the same both waterproof and noninflammable—in other words, impervious to water and difficult of ignition and of combustion.

The ingredients of the composition are as follows, and are mixed preferably in the manner, and approximately in the proportions, following, viz.:

(1) Melted paraffin wax, to be mixed while in liquid form, one pound.

(2) Paraffin oil, to be mixed with said melted paraffin wax, three pints.

(3) Fish oil or cottonseed oil, preferably the former, to be mixed, apart from the mixed paraffin oil and paraffin wax, with the two ingredients next to be named, one quart.

(4) Burnt umber or other dry earth color, ground exceedingly fine and mixed, apart from said paraffin oil and wax, with the last mentioned ingredient (3) and with the ingredient (5) which is next to be mentioned, one half pound. This coloring matter, however, may be altogether omitted from the compound, if no coloring is desired.

(5) Gasolene, first mixed with the two last specified ingredients (3) and (4), apart from said paraffin oil and wax, and then, together with those specified ingredients, mixed with said mixed paraffin oil and wax, three half pints.

(6) Burnt alum, the anhydrous aluminum and potassium sulfate, added to the foregoing ingredients, and mixed in, four ounces.

(7) Common salt, added to the foregoing and mixed in, four ounces.

The resulting product is of pasty consistency, not fit for use, but convenient for transportation and storage, and capable of being kept in storage for years without deterioration.

(8) Gasolene, added to the foregoing pasty mixture just before using, two quarts.

To this mixture no water should be admitted, and no drier which can harden.

The composition is specially designed for tents, tarpaulins, hay covers, wagon covers, horse covers, and other forms of canvas or cotton fabric. When applied to one side of the fabric with a brush, like paint, it renders the fabric pliable at all temperatures, and incapable of ready ignition or combustion. It obviates all need of drying the fabric, after use or wetting and before folding up and laying away; and prevents hardening, cracking, rotting, molding and burning.

The reason for using paraffin oil for mixing with the melted paraffin wax, as described, lies in the special availability of that oil for mixing with that wax. The fish oil, or cottonseed oil as its substitute, is chosen because it is cheap, stays always soft, has considerable preservative effect, and retains its properties without having been refined; linseed oil would injure the fabric, and other oils would gum. The alum and common salt are selected for their fire-proofing value, and are used as ingredients of the composition for the purpose of diminishing the combustibility of the material to which it is applied.

I am aware that paraffin wax, paraffin oil, gasolene or petroleum oils, fish oils, and alum, have been used in waterproofing compounds; but am not aware that all the ingredients of my composition have been used together, nor in similar proportions, nor for the same waterproofing and fireproofing purposes.

I claim as my invention—

1. The herein described composition of matter, consisting of paraffin wax, paraffin oil, fish oil, ground color, gasolene, burnt alum and common salt, all mixed together.

2. The herein described pasty mixture, being a new article of manufacture, to be used, when diluted with a suitable quantity of gasolene, for the treatment of cotton fabrics and the like, and consisting of the following ingredients in the following proportions, viz.: paraffin wax, one pound; paraffin oil, three pints; fish oil or its equivalent, one quart; gasolene, three half pints; and burnt alum and common salt, one quarter of a pound each.

In testimony whereof I hereunto subscribe my name in the presence of two witnesses.

MAX A. ROESSIG.

Witnesses:
WILLARD EDDY,
A. R. KELLEY.